R. BERNAT.
SYSTEM OF SUSPENSION FOR VEHICLES.
APPLICATION FILED FEB. 2, 1921.
1,436,144.
Patented Nov. 21, 1922
3 SHEETS—SHEET 1.
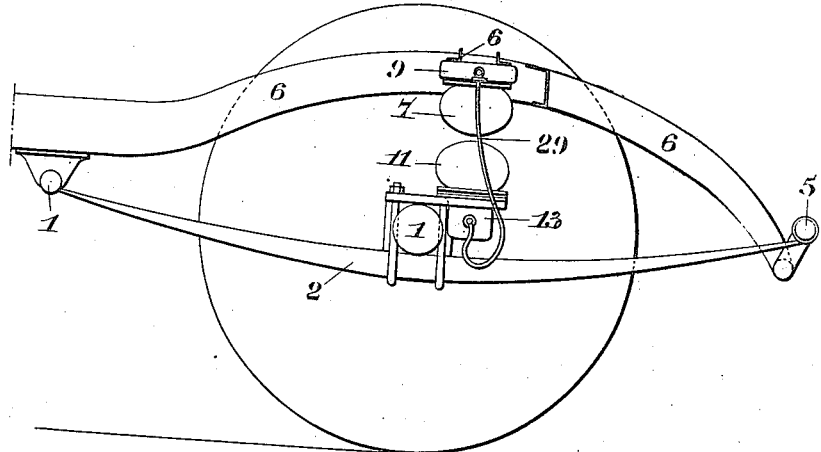
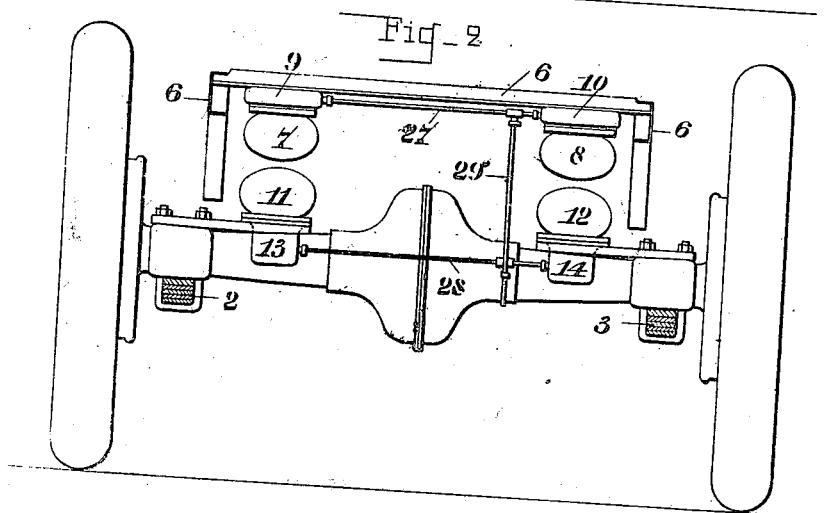
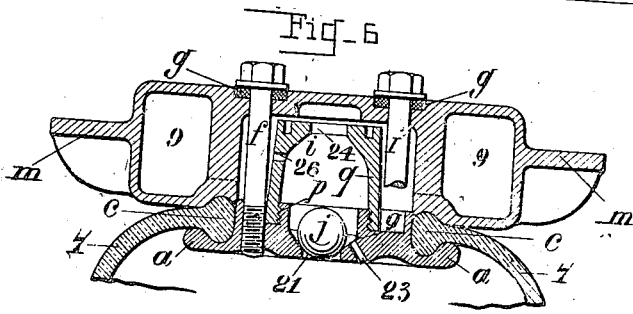
Inventor,
Raoul Bernat
By Lawrence Langner
Attorney.

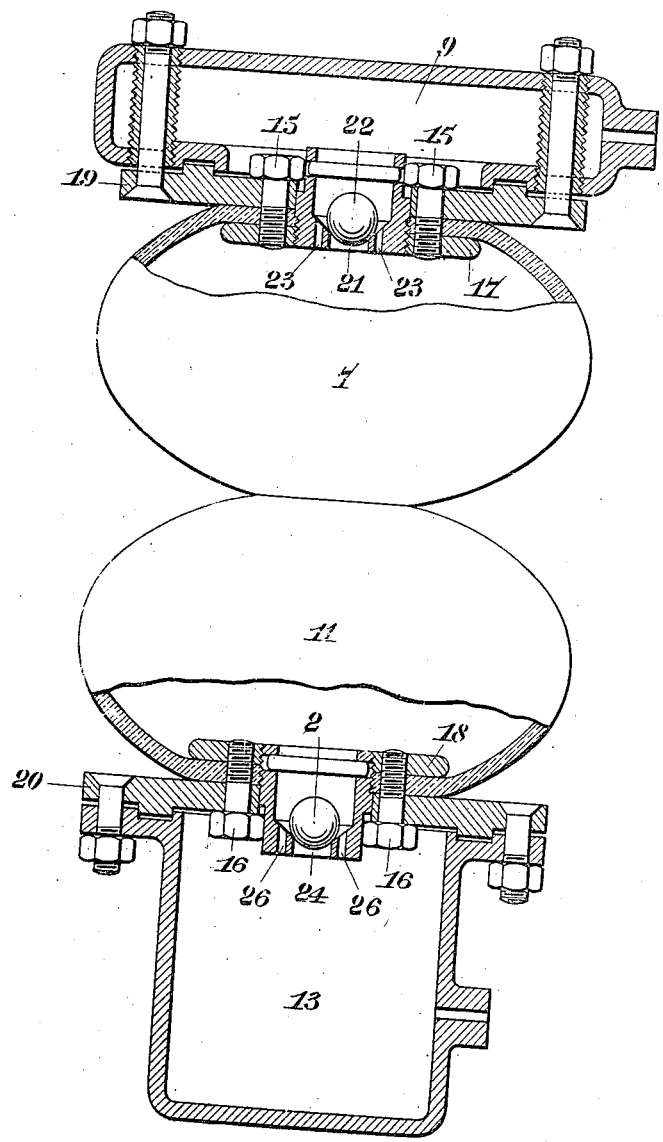

R. BERNAT.
SYSTEM OF SUSPENSION FOR VEHICLES.
APPLICATION FILED FEB. 2, 1921.
1,436,144.
Patented Nov. 21, 1922.
3 SHEETS—SHEET 3.
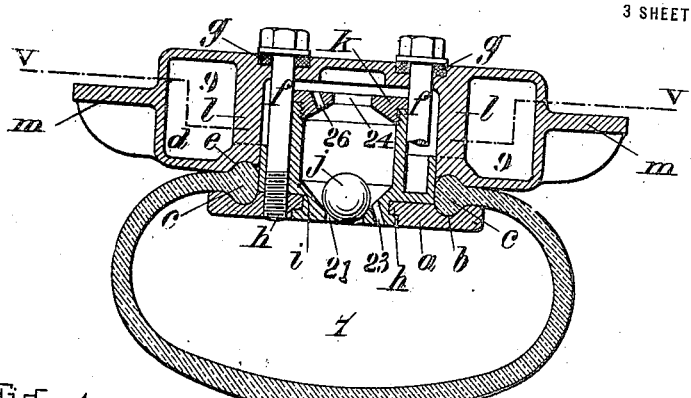
Fig. 4
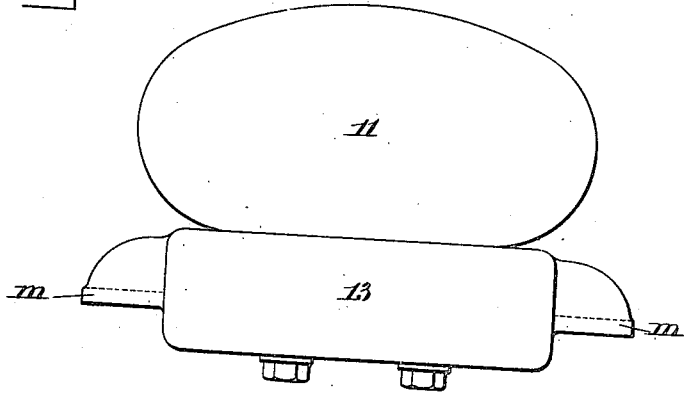
Fig. 5
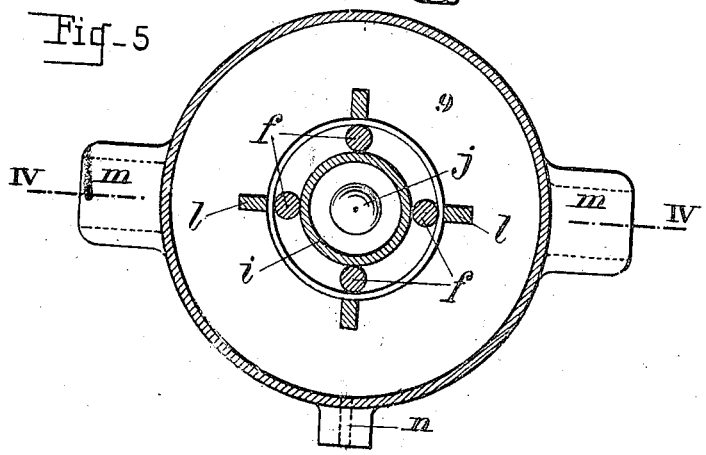
Inventor
Raoul Bernat
By Lawrence Langner
Attorney Patented Nov. 21, 1922.

1,436,144

UNITED STATES PATENT OFFICE.

RAOUL BERNAT, OF BORDEAUX, FRANCE.

SYSTEM OF SUSPENSION FOR VEHICLES.

Application filed February 2, 1921. Serial No. 441,848.

*To all whom it may concern:*

Be it known that I, RAOUL BERNAT, of Bordeaux, France, residing at Bordeaux, 6 Rue des Douves, have invented an Improved System of Suspension for Vehicles, of which the following is a specification.

The present invention has for its object an improved system of suspension for vehicles comprising the combination of leaf springs and of pneumatic cushions, the opposite reactions of which permit the oscillations which are imparted to the vehicle with ordinary springs when it encounters elevations or depressions on the road.

In order to facilitate the comprehension of the specification, it is shown by way of illustration in the accompanying drawings in which:—

Fig. 1 is a side elevation of a vehicle chassis provided with the system of suspension in question.

Fig. 2 shows a rear elevation of the same chassis.

Fig. 3 shows in detail view on an enlarged scale, and in elevation and partial section the essential elements of the system in question.

Fig. 4 shows a view in elevation and partial section on the line IV/IV of Fig. 5 showing a modification of the arrangement of the aforesaid elements.

Fig. 5 shows a view in section made on the line V/V of Fig. 4.

Fig. 6 shows a section corresponding to Fig. 4 and illustrates a modification of the construction of the device in question.

Referring to Figs. 1 to 3 of the drawings, it will be seen that the rear axle 1 of the vehicle bears at each of its ends a leaf spring 2, 3, which is selected so as to afford a great flexibility inasmuch as it cannot occasion violent and disagreeable reactions. The ends of these springs are connected in any suitable manner at 4 and 5 to the chassis 6 of the vehicle.

At each side of this chassis there are arranged two pneumatic cushions 7, 8, each comprising an air chamber 9, 10, fixed to the chassis and two other pneumatic cushions 11, 12, each having a reservoir 13, 14 fixed on the axle 1.

The above mentioned cushions may be formed by means of air chambers placed in leather bags or preferably of rubber and canvas.

Whatsoever the method of construction of the cushions, they are secured by means of the bolts 15, 16, and the counter parts 17, 18, or in any other suitable manner upon the supports 19, 20; each fixed upon each of the higher and lower reservoirs 9 and 13.

As shown in the drawing in Fig. 3 the air circulation between the cushion 7 and the reservoir 9 can be effected rapidly through the tube 21 when the ball or valve 22, which normally closes this pipe, is raised; the circulation of the air in the opposite direction to the preceding, that is to say from the reservoir 9 towards the cushion 7, takes place on the contrary slowly, through the little orifices 23. Inversely the circulation of the air from the reservoir 13 into the cushion 11 is effected rapidly through the pipe 24 when the ball or valve 25, which normally closes this pipe, is raised, whereas the return of the air from the cushion into the reservoir 13 is effected slowly through the little orifices 26.

As shown in Fig. 2 of the drawing, the upper reservoirs 9 and 10 are connected together by a tube 27, and the lower reservoirs 13 and 14 are connected together by a tube 28. The two tubes 27 and 28 are, however, interconnected by a flexible tube 29 and these communications are effected by tubes of very small diameter so that the operation of each cushion may be regarded as independent.

The action of the system constructed as above explained is as follows.

When the vehicle is empty there is a slight free space between the cushions 7 and 11 on the one part and the cushions 8 and 12 on the other part. When the vehicle is loaded the above mentioned cushions first come into contact, and their contact surface increases in proportion as the load increases. At the same time and by reason of their reduction in volume, the internal pressure increases in the cushions.

Consequently the resistance of these pneumatic cushions increases progressively as the loads themselves increase progressively. Therefore under such conditions the bending of the metallic spring increases progressively. There is, therefore, established between the two elastic elements combined in the system described, that is to say the pneumatic element on the one hand and the metal element on the other hand, an opposing action which prevents the synchronism of the oscillations of the vehicle. Under these conditions when one of the wheels of the vehicle encounters a projection on the ground a portion of the air contained in the upper cushion corresponding to this wheel (cushion 7 for instance) is immediately discharged into the reservoir above the said cushion (reservoir 9). It results that the chassis of the vehicle is not thrown up into the air. If, on the contrary, the wheel falls into a depression in the ground, the air contained in the lower reservoir (reservoir 13 in the present case) passes into the corresponding cushion (cushion 11 in this instance) which has the effect of supporting the chassis. In the one and the other of the two cases above set forth, the vehicle consequently follows a trajectory almost rectilinear.

The improved system which forms the object of the present invention thus admits of avoiding sudden reactions, which are always produced with ordinary metallic springs; in fact the springs according to this invention being selected very flexible in the case of the system in question, the cushions are substituted for them when passing over difficult places. It should also be remarked that the interior combination of parts acts in a manner essentially opposed, both as to the respective actions of the metallic elements and of the pneumatic element as in that which relates to the respective operation of the aforesaid pneumatic elements themselves, regard being had to the different actions according to which the rapid flow of the air is effected in the case of the upper cushions on the one hand and in the case of the lower cushions on the other hand. This double opposition enables this to obtain the suppression of the oscillatory motions.

It is assumed that the cushions are inflated at a pressure increased in proportion as the load itself is increased, the system in question permitting of adapting exactly the suspension of the vehicle to the load which it has to support.

It should further be remarked that for the inflation the pneumatic cushions above described may be placed in connection with a suitable accumulator of any kind (not shown in the drawing). Moreover, a cock combined with a discharge valve placed conveniently for the hand of the driver, enables him to vary at will the pressure existing in the interior of the cushions and to adapt it exactly to the motion of the load.

Figures 4 to 6 of the accompanying drawings illustrate two modifications of the construction in question. In the construction above described the method of fixing the pneumatic cushions such as 7 and 11 upon the reservoirs 9 and 13 includes attachments which secure by means of bolts the cushions upon the holders, which are themselves connected to the corresponding reservoir by means of bolts. It is then necessary with this method of securing, in order to assure the fixing of a cushion upon its reservoir, to make use of two intermediate parts and of eight bolts or screws. In conformity with the modification now to be described, this mounting is simplified in a very important manner by fixing the cushions directly upon the corresponding reservoirs in the manner shown in Fig. 4 of the accompanying drawing. For this purpose there is placed in the interior of each of the cushions a piece $a$ which has upon its periphery a circular groove $b$ devised to receive one of the parts of a clamp $c$ which terminates the rim of the cushion around its opening. The bottom $d$ of the reservoir 9 possesses a circular groove $e$ corresponding to that already described and adapted to receive the other part of the clamp $c$.

The clamping of these two parts is assured by means of four screws $f$ the heads of which rest upon the free bottom of the reservoir and have their threaded ends engaging in a corresponding fillet on the part $a$. The airtightness of the screw heads upon the free bottom of the reservoir is secured by means of washers $g$ of compressible material preferably of paraffined leather. This method of mounting enables thus to dispense with the counter part and with all the four screws or bolts, which simplifies the construction and effects a notable economy in the cost. The part $a$ has a shoulder $h$ upon which is fixed the box $i$ containing the ball $j$ forming a valve. It should be remarked here that this valve box can operate in both directions the cushion and its reservoir being capable of being fixed either upon the chassis or upon the axle. The bottom of the box is, moreover, perforated with an opening 21 forming the seat for the valve when the reservoir is arranged above the valve and has an opening of diminished diameter 23. On the other hand, the box comprises a cover $k$ provided with an opening 24 forming a seating for the valve when the reservoir is placed underneath the cushion and has an opening of reduced section 26. Under these conditions, the circulation of the air between the reservoir and the cushions will be absolutely assured as in the case of the example already described; and this with a unique pattern of the combination of reservoir and cushion which can be placed either in the one position or in the other, that is to say either upon the chassis or upon the axle.

Fig. 5 shows in section, on the line V/V of Fig. 4 the reservoir 9 of cast metal in a single piece with its four divisions $l$, its two supports $m$ permitting it to be fixed at will either upon the chassis or upon the axle; in the one direction or in the other and its projection $n$ permitting of connecting it to the reservoir with which it is coupled as in the preceding case.

Figure 6 indicates a modification of the construction of the reservoir which effects a simplification in the construction as shown in Figs. 4 and 5.

In this modification the part $a$, which is stamped out, is so arranged as to form the bottom $o$ of the valve box $i$, this bottom being provided as before with openings 21 and 23. On this bottom which includes the externally filleted rim $p$, there is screwed a cover $q$ completing the valve box and provided with the openings 24 and 26 as in the preceding case. The reservoir 9 is always constructed in the same manner as in the case of Figures 4 and 5 and its assemblage upon the part $a$ is always effected in the same maner by means of screws $f$.

Having now particularly described and ascertained the nature of my said invention, and in what manner the same is to be performed, I declare that what I claim is:—

1. The combination with the chassis and axle of a vehicle, of a pneumatic cushion interposed between said parts, comprising a pair of oppositely arranged compressed air reservoirs supported by said chassis and axle, respectively, and a deformable container mounted directly upon and in communication with each of said reservoirs.

2. The combination with the chassis and axle of a vehicle, of a pneumatic cushion interposed between said parts, comprising a pair of oppositely arranged compressed air reservoirs supported by said chassis and axle, respectively, and a deformable container mounted directly upon each of said reservoirs, the reservoir mounted upon the chassis communicating with its container by an orifice closed by a valve opening from the container toward the reservoir and the reservoir mounted upon the axle communicating with its container by an orifice closed by a valve opening from the reservoir towards the container, there being a slow return passage between each reservoir and its container.

3. A pneumatic cushion as set forth in claim 1 in which communication is established between the two reservoir-containers by means of a tube of such small diameter that each reservoir-container functions substantially independently of the other.

4. A pneumatic cushion as set forth in claim 2 in which the container is fixed to its reservoir by means of a suitably formed clamp provided with a shoulder upon which is mounted the valve box.

5. A pneumatic cushion as set forth in claim 2 in which the valve box is provided with duplicate orifices for the slow return of the air between the container and reservoir and duplicate valve seats whereby the combined reservoir-container can be fixed either to the chassis or axle.

6. A pneumatic cushion as set forth in claim 4 in which the clamp for fixing the container to the reservoir constitutes one of the ends of the valve box and is provided with a valve seat and a slow return passage, a head completing the said box being fixed to said clamp and comprising the other end of said box which is also provided with a valve seat and a slow return passage.

In testimony whereof I have signed my name to this specification in presence of two subscribing witnesses.

RAOUL BERNAT.

Witnesses:
HENRIETTE LA ZEAUX,
N. FAVRE.